United States Patent [19]

Pecoraro

[11] Patent Number: 5,135,641
[45] Date of Patent: Aug. 4, 1992

[54] CATALYTIC CRACKING PROCESS EMPLOYING SILICA/ALUMINA COGEL CATALYSTS

[75] Inventor: Theresa A. Pecoraro, Danville, Calif.

[73] Assignee: Chevron Research Company, San Francisco, Calif.

[21] Appl. No.: 577,649

[22] Filed: Sep. 4, 1990

Related U.S. Application Data

[60] Division of Ser. No. 440,556, Nov. 22, 1989, Pat. No. 4,988,659, which is a continuation-in-part of Ser. No. 275,470, Nov. 23, 1988, abandoned.

[51] Int. Cl.$^5$ .............................. C10G 11/04
[52] U.S. Cl. .................... 208/120; 208/113; 208/106; 208/111; 208/46; 208/119
[58] Field of Search ........................ 208/120

[56] References Cited

U.S. PATENT DOCUMENTS

| | | | |
|---|---|---|---|
| 2,548,860 | 4/1951 | Bond | 196/52 |
| 2,565,886 | 8/1951 | Ryland | 252/453 |
| 2,782,144 | 2/1957 | Pardee | 196/52 |
| 2,908,635 | 10/1959 | Ogorrzaly | 208/120 |
| 3,140,249 | 7/1964 | Plank | 208/120 |
| 3,210,293 | 10/1965 | O'Hara | 252/453 |
| 3,352,796 | 11/1967 | Kimberlin, Jr. et al. | 252/455 |
| 3,444,265 | 6/1969 | Gladrow et al. | 252/455 |
| 3,553,104 | 1/1971 | Slover et al. | 252/451 |
| 3,558,476 | 1/1971 | Robbins, Jr. et al. | 208/126 |
| 3,860,532 | 1/1975 | Takase et al. | 252/453 |
| 3,867,308 | 2/1975 | Elliot, Jr. | 252/455 Z |
| 4,198,319 | 4/1980 | Alafandi et al. | 252/455 Z |
| 4,226,743 | 10/1980 | Seese | 252/455 Z |
| 4,259,212 | 3/1981 | Gladrow et al. | 252/455 Z |
| 4,289,653 | 9/1981 | Jaffe | 252/453 |
| 4,310,441 | 1/1982 | Alafandi et al. | 252/453 |
| 4,442,223 | 4/1984 | Chester et al. | 502/68 |
| 4,480,047 | 10/1984 | Beck et al. | 502/65 |
| 4,499,197 | 2/1985 | Seese et al. | 502/65 |
| 4,588,702 | 5/1986 | Beck et al. | . |
| 4,617,108 | 10/1986 | Shyre et al. | 208/120 |
| 4,707,461 | 11/1987 | Mitchell et al. | 208/120 |
| 4,869,803 | 9/1984 | Ward | . |
| 4,924,338 | 5/1990 | Wormsbecher | 208/120 |

FOREIGN PATENT DOCUMENTS

| | | | |
|---|---|---|---|
| 481188 | 2/1951 | Canada | 502/235 |
| 2166970 | 4/1985 | United Kingdom | . |

OTHER PUBLICATIONS

"Diff. Between Si and Silica/Alumina Gells", Plank et al. pp. 399-412, Socony-Vacuum Lab, Aug. 9, 1946.
Prediction of Crack Cats. Behavior by a Zeolit Unit Cell Size Model LA Pine et al. Journal of Catalysis 85, 446-476, Aug. 1983.
Diff Between Si & Si/Alumina Gells II, Propose Mech for Colation & Syneresis of the Gells Plant, Socony Vacuum LAB413-427 Jul. 1947.

Primary Examiner—Helane Myers
Attorney, Agent, or Firm—J. A. Hagenah

[57] ABSTRACT

Novel hydrocarbon conversion catalysts and methods for their preparation and use are disclosed. The catalysts are particularly appropriate for the conversion of hydrocarbon feeds to high octane gasoline, while increasing light cycle oil and decreasing heavy cycle oil yield. The catalyst comprises a unique cogelled silica-alumina matrix.

3 Claims, 4 Drawing Sheets

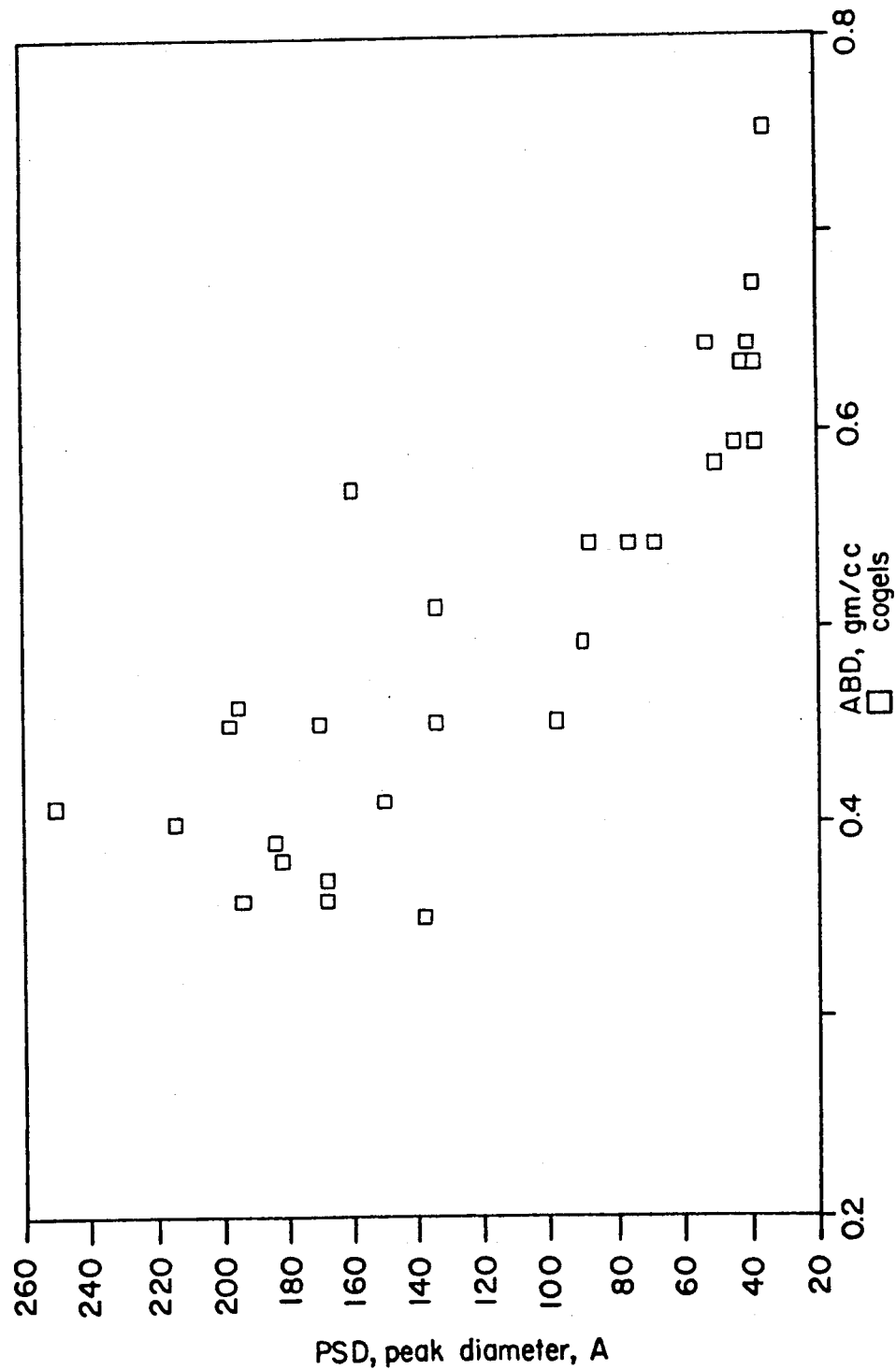

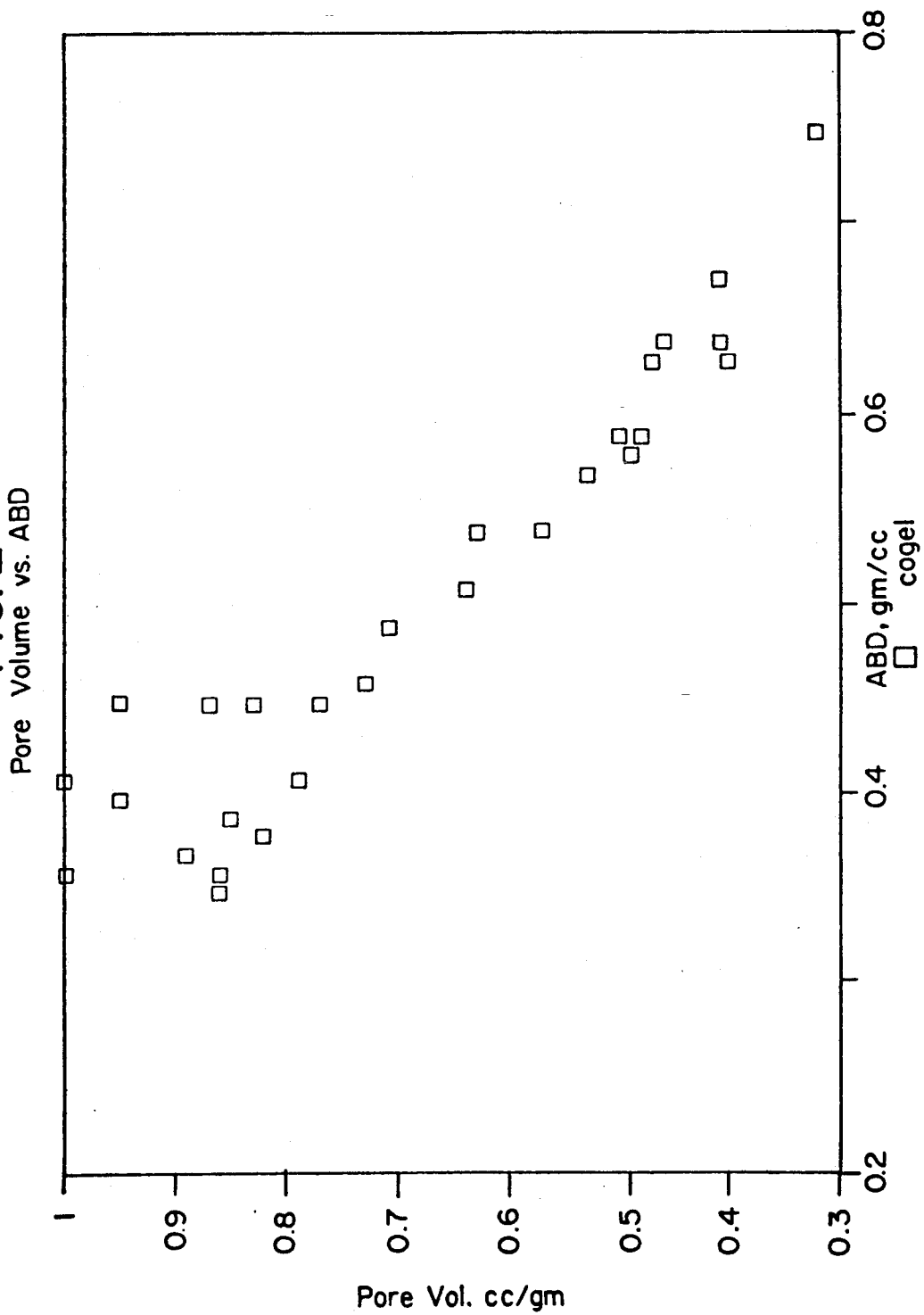

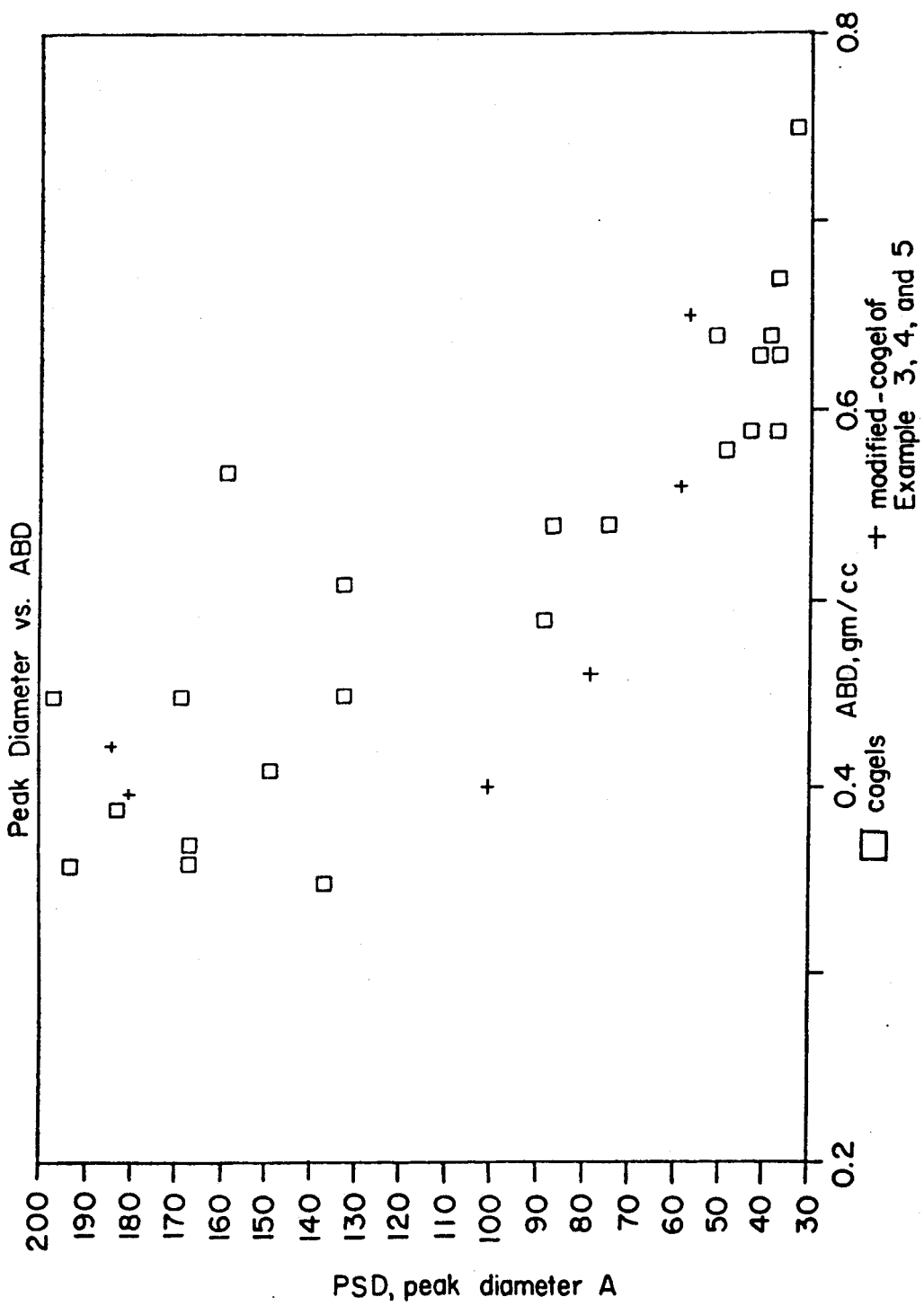

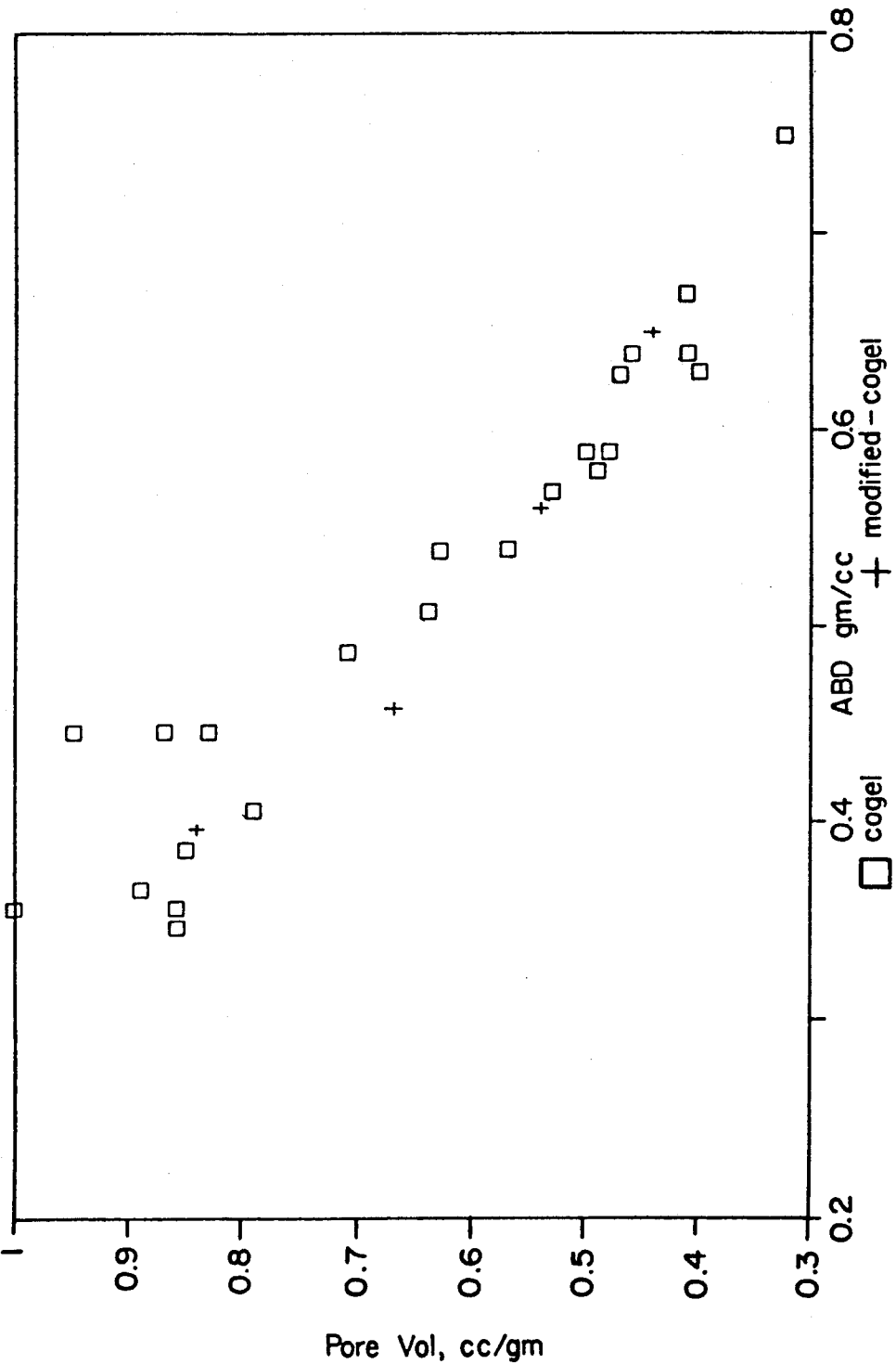

CATALYTIC CRACKING PROCESS EMPLOYING SILICA/ALUMINA COGEL CATALYSTS

This is a division of application Ser. No. 440,556, filed Nov. 22, 1989, now U.S. Pat. No. 4,988,659, which is a continuation-in-part of U.S. Ser. No. 275,470, filed Nov. 23, 1988, now abandoned.

FIELD OF THE INVENTION

This invention relates to novel hydrocarbon conversion catalysts and their supports, methods for their preparation, and use thereof in hydrocarbon conversion processes. More particularly, the present invention relates to a high activity, large-pore silica/alumina cogel suitable for the conversion of hydrocarbon feeds. The cogel may also advantageously incorporated into cracking and hydroprocessing catalysts.

BACKGROUND OF THE INVENTION

Silica, alumina and their amorphous mixtures are well known as catalysts used in hydrocarbon conversion process. The method of preparation clearly controls the resultant activity (such as cracking or isomerization activity), and physical properties (such as pore structure and volume, surface area, density and catalyst strength). Silica/-alumina catalysts such as in the present invention can be used "as is", particularly in reactions that require acidic catalysts, or can optionally be combined with zeolites, clays or other binders, and inorganic oxides for the cracking of liquid hydrocarbons in cracking reactors such as fluid catalytic crackers.

DESCRIPTION OF RELEVANT ART

Numerous silica/alumina catalyst composites and processes for their preparation are described in the patent literature. Silica-alumina composites have been used commercially for a variety of hydrocarbon processing applications, such as cracking, desulfurization, demetalation, and denitrification.

The variety of manufacturing techniques presented in the art, which have been recognized as patentably distinct modifications, attest to the fact that the final catalyst properties are highly dependent upon the precise method of manufacture. Such variety, with seemingly subtle differences, is also an indicia of the unpredictability of catalyst manufacturing procedures in general. The change of a single step to another apparently equivalent step may result in a more desirable pore structure, increased activity, lower deactivation rates, higher crush strengths or a totally worthless product. Despite major advantages in the art, as exhibited by great numbers of new emerging catalysts, the effect upon the final catalyst of changing a single step cannot be predicted with certainty, and thus most catalyst research continues by laborious trial and error.

The prior art teaches a number of ways to prepare these compositions which affect the chemical and physical properties of the final catalyst composition. U.S. Pat. No. 4,499,197, Seese et al., for example, describes the preparation of inorganic oxide hydrogels, and more particularly, catalytically active amorphous silica-alumina and silica-alumina rare earth cogels. The active cogels are prepared by reacting aluminate and silicate solutions to obtain a silica-alumina pregel, and then reacting the pregel with an acidic rare earth and an aluminum salt solution with complete mixing. C. J. Plank, *Journal of Colloid Science*, 2,413 (1947), describes the effect of pH, time, and exchange medium on the porous structure of a silica-alumina gel. U.S. Pat. No. 4,226,743 describes a process for preparing a silica-alumina catalyst which is dense and attrition resistant. The silica-alumina hydrogel is precipitated at high pH and subsequently reacted with sufficient acid aluminum salt at a pH below 4 to obtain an acidic hydrogel slurry. Substantial quantities of clay and/or crystalline alumino-silicate zeolites may be included. U.S. Pat. No. 4,310,441 describes large pore silica-alumina gels and a method for producing them. The silica-alumina gel is derived from a cationic aluminum source and also an anionic aluminum source.

The patent literature contains examples that teach and claim specific methods of silica/alumina matrix and catalyst preparation. Some recent patents for preparing matrices and FCC catalysts therefrom include: U.S. Pat. No. 4,617,108, Shyr, which purports to teach a process where catalyst is prepared by a method comprising preparing hydrogel by mixing an aluminum, ammonium and salt of a strong (pKa<2) acid, and alkali metal silicate such that the concentration of ammonium is enough to form a hydrogel, separating the hydrogel from solution and calcining it to form acidic silica-alumina. Shyr teaches the combination of this matrix with clay and zeolite for use in an FCC unit.

U.S. Pat. No. 4,198,319, Alafandi, discloses a process where catalyst is prepared by a method comprising mixing in a slurry a faujasite or silica-aluminum gel containing 50-70 mole silica, and clay, and spray-drying slurry into a catalyst. Alafandi also shows combinations of gel with clay and zeolite for use in an FCC unit.

U.S. Pat. No. 4,289,653, Jaffe teaches preparing an extruded catalyst by mixing aluminum sulfate and sulfuric acid with sodium silicate to form a silica sol in an alumina salt solution at pH of 1-3, adding $NH_4OH$ under substantially constant pH of at least 4 to 6; adding more $NH_4OH$ to form a cogelled mass to pH 7.5-8.5; washing cogelled mass; mulling the mass with peptizing agent, a Group VI-B metal compound and a Group VIII metal compound to form extrudable dough; extruding; and drying and calcining.

SUMMARY OF THE INVENTION

This invention comprises catalytically-active silica/alumina cogels capable of hydrocarbon conversion. Specifically, it comprises a catalyst base comprised of high surface area silica/alumina cogel tailored to contribute to both the activity and octane-enhancing characteristics of the catalyst. The invention also comprises a process for preparing the catalyst and a process for converting hydrocarbonaceous feedstock using the catalyst. Among other factors, the catalyst not only converts hydrocarbon feeds to high octane gasoline, but increases the light cycle oil yield and decreaes the heavy cycle oil yield also while improving the quality of both.

More specifically, the catalyst composition of this invention comprises a cogelled, silica-alumina matrix prepared by the method which comprises:

a. mixing a silicate solution with an aqueous solution of an acid aluminum salt and an acid, to form an acidified silica sol in said aluminum salt solution, and adjusting said silica sol/aluminum salt solution mixture to a pH in the range of about 1 to 4;

b. slowly adding sufficient base with vigorous stirring, to said acidified silica sol/aluminum salt solution mixture to form a cogel slurry of silica and alumina, and to adjust said slurry to a pH in the range of about 5 to 9;

c. aging said cogel slurry at a temperature of ambient to 95° 'C.;
  d. adjusting the pH of said cogel slurry to about 5-9;
  e. recovering a cogelled mass from said slurry;
  f. washing said cogelled mass;
  g. adjusting the pH of said cogelled mass to between about 4 and 7, and controlling to induce syneresis; and
  h. forming said combination into particles.

The catalyst also performs well in combination with known "octane-enhancing" additives, such as H-ZSM-5, to yield an increased octane rating of the gasoline fraction.

BRIEF DESCRIPTION OF THE FIGURES

FIG. 1 is a graphic representation of the peak diameter of the pore size distribution versus the apparent bulk density (ABD) of a catalyst of the present invention.

FIG. 2 is a graphic representation of the pore volume versus the apparent bulk density of a catalyst of the present invention.

FIG. 3 is a graphic representation of the the peak diameter of the pore size distribution versus the apparent bulk density (ABD) of another, modified cogel of the present invention.

FIG. 4 is a graphic representation of the pore volume versus the apparent bulk density of another, modified catalyst of the present invention.

All the figures illustrate the wide variation in pore size distribution and pore volume obtainable with cogels of this invention (as typified by Examples 1 and 5).

DETAILED DESCRIPTION OF THE INVENTION

The cogel comprising the present invention is preferably composed of silica, alumina and their amorphous mixtures. The method of preparation controls physical properties, such as pore structure and volume, surface area, density and catalyst strength, which in turn governs the resultant activity such as cracking or isomerization. It must be noted that seemingly very minor differences in the preparation factors discussed below can make significant differences in the make-up and effectiveness for a particular purpose of the matrix and a catalyst of which it may be a component.

The numerous specific factors that are involved in preparing materials containing silica-alumina mixtures include;
1. the mole ratio of silica to alumina;
2. the molar concentrations of the silica and alumina in water;
3. the type and/or source of silica;
4. the type and/or source of alumina;
5. the order of addition of silica and alumina;
6. the pH of the solutions when combined;
7. the pH of the mixture during precipitation;
8. the pH of the mixture after precipitation;
9. the precipitating agent;
10. temperatures throughout the process;
11. mixing rates;
12. presence or absence of aging;
13. presence or absence of syneresis;
14. peptization agent;
15. washing and washing agents;
13. method of drying.

The properties of the composition are highly sensitive to each of these factors, and variations among these factors, especially in combination, will greatly influence the particular properties of the final cogel produced.

This cogel is surprisingly active for the cracking of large molecules, such as in vacuum gas oils, to smaller molecules, such as gasoline, and finds particular use as the active matrix for catalysts. The olefinicity of the products, as indicated by the $C_4$ olefin to $C_4$ total ratio, is surprisingly high. This is indicative of gasoline of high octane.

Besides the cogel itself, the present invention also contemplates a process for preparing the amorphous silica-alumina cogel, which can be formed into spheres via spray drying, and then subsequently dried to a water content of less than 5 wt. percent. It is also contemplated that the cogel may be incorporated into a multi-component catalyst. The process for preparing the amorphous silica-alumina cogel yields a material which is surprisingly versatile with respect to the pore volumes, pore size distributions, and apparent bulk densities, attainable. The cogels can be made in either a batch or a continuous mode.

Among the unique characteristics of the fresh/non-steamed cogel are:

high MAT conversions obtainable between about 55% and 80%;

high surface areas, ranging from about 150 to 450 $m^2/gm$;

$N_2$ pore volumes ranging from about 0.2 cc/gm to 1.2 cc/gm;

$N_2$ pore size distribution peak diameter ranging from about 30 Å to 260 Å, most pores occurring in the mesopore range of 20 to 500 Å. (Micropores are defined as <20 Å. Macropores are defined as >500 Å. This pore size distribution allows access into the catalyst of larger hydrocarbon molecules, rendering the present catalyst particularly suitable for residua applications.)

$\gamma$-$Al_2O_3$ content of the cogels of less than 20 weight percent, usually less than 5 weight percent, after calcining.

The preferred cogel may be further defined as one which, in its equilibrium state, exhibits a specified activity expressed as a weight percentage derived from the microactivity test (MAT). It may also be described as one which exhibits a specified selectivity expressed as the ratio of $C_4$ olefins to the total $C_4$ product as derived by the MAT. The preferred MAT activity of the present catalyst is measured by a modified ASTM D-3907. The ASTM D-3907 procedure provides relative MAT activity for conversion of a standard feed at standard conditions. We have modified the procedure by changing conditions and feedstocks as shown in the Tables. The ratio of the $C_4$ olefin to the total $C_4$ product correlates well with the octane values of the light gasoline, i.e., the higher the $C_4$ olefin to $C_4$ total ratio, the higher the octane of the light gasoline. This ratio also suggests that the octane of the heavy gasoline will also be improved. For the purposes of this invention, light gasoline is defined as the $C_5$ fraction up to material boiling at approximately 265° C. and heavy gasoline as the material boiling from approximately 265° C. to 430° C.

The foregoing weight percentage and ratio of $C_4$ olefins to the total $C_4$ product are the values obtained on a standard feed at 496° C. (925° F.), 15 to 16 (weight hourly space velocity), 3 C/O (catalyst to oil weight ratio), and calculated on the basis of a pre-equilibrated (as described above) catalyst dried at 593° C. (1100° F.) in air.

The preferred cogel can also be categorized as one which, in the course of extended operation, maintains a level of conversion of at least 40% by weight or volume and, more preferably, of at least 50% by weight, particularly on a Feedstock such as Feedstock A in the Examples.

In a preferred embodiment, the silica-alumina cogelled catalyst is prepared by the steps comprising:

1. adding a silicate solution to an aqueous solution of an acid aluminum salt, such as aluminum chloride or aluminum sulfate and an acid, such as hydrochloric or sulfuric, but preferably a weak acid such as acetic, to form an acidified silica sol in said aluminum salt solution; the pH of said mixture being in the range of 1 to less than about 4;
2. raising the pH of the mixture by adding base, such as NaOH or $NH_4OH$, preferably $NH_4OH$, to a pH range of about 5-9;
3. aging the cogelled slurry slurry by time and/or temperature combinations;
4. removing the filtrate to recover the cogelled mass;
5. adding an acid, such as nitric, sulfuric, or hydrochloric, but preferably a weak acid such as acetic acid, to adjust the pH to 4-7 to induce controlled syneresis. Various combinations of time, temperature, pH and $Na^+$ concentration can also be used to induce the desired syneresis;
6. spray-drying the cogel mass to form spherical particles;
7. washing either the cogelled hydrogel or the spray-dried particles to reduce the $Na_2O$ content to less than 1 weight percent.

The mixing steps to make the cogelled slurry can be prepared in either a batch or a continuous mass.

Several definitions and explanations are required to clarify further the steps comprising the preparation of the cogel. First, the silica sol described in Step 1 is preferably defined as a colloidal dispersion or suspension of the metal oxide in a liquid. In a step 3, cogelled slurry or hydrogel may be described as a coagulated colloid with an imbibed liquid phase. In step 5, "syneresis" refers to molecular rearrangements which occur in hydrogels, in particular, silica and silica-alumina hydrogels. These rearrangements consist of condensation reactions among the units present in the hydrogels. Any factors which promote or disrupt these reactions affect the structure of the hydrogel and also the structure of the final dried cogel.

A process parameter critical to the successful creation of the desired catalyst is the syneresis of the co-gelled mass. Syneresis may be best defined or analogized to an aging process in which a composition, particularly a hydrogel, contracts and gives up a liquid, usually water, in the process. This syneresis in the present invention materially alters the nature of the cogelled may and therefore the resulting spray-dried cogel catalyst, rendering it uniquely suitable for the purposes discussed above. For a discussion of syneresis in silica-alumina gels, see C. J. Plank, et al., J. Colloid. Sci., 2 (1947) 399, and C. J. Plank, J. Colloid. Sci., 2 (1947) 413, incorporated herein by reference.

Several factors affect syneresis. Among these are the composition of the hydrogel or gel, the solids concentration of the gel, the pH, time, temperature, [$Na^+$] and the base exchange medium. Consequently, step 5 helps to control the physical and chemical characteristics of the spray-dried co-gel, e.g., pore volume and pore size distribution. Several definitions and explanations are required to clarify further the steps comprising the preparation of the cogel. First, the silica sol described in Step 1 is preferably defined as a colloidal dispersion or suspension of the metal oxide in a liquid. In step 3, "hydrogel" refers to molecular rearrangements which occur in hydrogels, in particular silica and silica-alumina hydrogels. These rearrangements consist of condensation reactions among the units present in the hydrogels. Any factors which promote or disrupt these reaction affect the structure of the hydrogel and the structure of the final dried cogel. Aging at temperatures of about 25°-105° C., preferably 60°-90° C., in step 3 affects the rate of filtration in step 4 and the physical characteristics of the spray-dried product of step 6. In a less preferred embodiment, step 5 may be eliminated. Step 7, washing the cogelled mass or the spray-dried particles, may be accomplished at ambient or elevated temperatures, i.e. <100° C., with base exchange medium such as ammonium acetate, or $Al^{+++}$ containing solution to reduce the $Na^+$ concentration to less that about 0.5 weight percent. Ammonium acetate at elevated washing temperatures is particularly effective. Step 7 may be done at various points in the procedure after step 2. Generally, the cogelled mass is washed prior to mixing with the zeolite. The gellation, encompassed by step 1 and 2, may be done in a batch or continuous manner.

This amorphous silica-alumina cogel catalyst shows high MAT conversion both as prepared and after steaming. The MAT conversions of the fresh cogelled catalyst as prepared ranges from 45 to 80 weight percent conversion, preferably >65%, most preferably >70 weight %. The MAT conversion of the steamed materials range from about 40 to ~65 weight percent, more preferably >50 weight percent.

As discussed above, it is preferable that the cogelled product is spray-dried after homogenizing the slurry. These particles which are formed by spray-drying may also be exchanged with polyvalent ions subsequent to spray-drying, more preferably exchanged with rate earth ions subsequent to spray-drying.

Other components can be combined with the cogel, for example zeolites (large, intermediate, and/or small pore), sieves, such as Beta, SAPO's, ALPO's etc., clays, modified clays, inorganic oxides, and oxide precursors, metals, carbon, organic substances, etc. These may be added in steps 1, 2, 5, and/or 7, above. In addition, other metals may be used to exchange residual $Na_2O$. In these compositions the cogels have been found to be excellent matrices for FCC applications, as well as excellent supports for hydrocracking applications. See U.S. Ser. No. 252,236, filed Sep. 30, 1988, incorporated herein by reference.

The spray-dried cogel may be used as a cracking catalyst, particularly when used in combination with clays or other binders, and/or with a zeolite. In general, in order to employ a cracking catalyst which shows high levels of activity in a commercial FCC operation, it is preferred to employ a catalyst which, in the course of extended operation, maintains a level of conversion of at least 40% by weight and more preferably of at least 50% by weight. In this context, the weight percent conversion represents 100 minus the weight percent of fresh feed boiling above the temperature of 221° C. (430° F.). The weight percent conversion includes the weight percent coke and the weight percent fresh feed boiling below the temperature of 221° C. (430° F.). The conversion capabilities may be expressed in terms of the conversion produced during actual operation of the FCC process or in terms of the conversion produced in standard catalyst activity tests. It is also within the contemplation of the invention to include the use of the cogel for the in a process for the catalytic cracking of hydrocarbonaceous feedstocks. It finds particular use for processing residuum or incremental residuum, more particularly residuums containing catalyst-contaminating metals.

The following Examples are illustrative of the present invention, but are not intended to limit the invention in any way beyond what is contained in the claims which follow. The data for Examples 1-5 are shown in Table I.

EXAMPLES

EXAMPLE 1

Into a mixing tank, 1.808 lbs. of acetic acid was added to 10.25 lbs. of deionized water (DI). 24.173 albs. of aluminum trichloride solution was added, which contained 4.38 weight percent aluminum and which had a pH of 1.1. The solution was stirred for ten minutes and had a resultant pH of about 0.44.

Into a different mixing vessel, 10.453 lbs. of a sodium silicate solution containing 28.7 wt. % $SiO_2$ with 56.69 lbs. of DI water. The solution was mixed for 10 minutes and had a resultant pH of about 10.3.

The sodium silicate solution was slowly pumped into the tank containing the aluminum trichloride solution. It took 52 minutes to add the silicate solution; the final solution was clear and had a pH of about 2. The aluminum trichloride solution was stirred vigorously.

A dilute solution of $NH_4OH$ by adding 13.48 lbs. of $NH_4OH$, which contained 28 wt. % $NH_3$ to 43.28 lbs. of DI $H_2O$. The $NH_4OH$ solution was slowly pumped into the silica-, alumina-, acetic acid solution, with vigorous mixing, until a pH of 8 was reached. It took approximately 57 minutes to add the $NH_4OH$. The ammonium hydroxide addition rate must be sufficiently slow to prevent the contents of the vessel from hydrogelling too quickly.

The resulting slurry was stirred for 3 hours and the final pH was readjusted to 8, if necessary. The slurry was filtered at room temperature.

The filter cake was washed with a solution of 1.18 lbs. of $NH_4HCO_3$ dissolved in 30 liters of water (DI). This wash was repeated three more times. It was then washed once with 30 liters of water (DI).

The dried and washed cogelled mass was then divided into several batches, A-E, for further treatment and spray drying.

Batch A: 600 mls. of water (DI) was added to 4100 grams of cogelled mass. The mixture was homogenized. Its pH was about 8.1. The mixture was then spray dried.

Batch B, C, D: 62 grams of acetic acid was added to 8,679.04 grams of the cogelled mass (LOI ~90 wt. %) to reduce the pH to about 5.42 and induce syneresis. 22 additional grams of acetic acid were added to reduce further the pH to 4.83. The mixture was then homogenized, after which ammonium hydroxide was added to raise the pH to 5.59.

Batch B was aged at ambient temperature for 1 hour. The pH was 5.59.

Batch C was aged at ambient temperature for 4 hours. The pH was 5.61.

Batch D was aged at ambient temperature for 24 hours. The pH was 5.81.

Batch E: 50 grams of acetic acid was added to 4544 grams of the cogelled mass (LOI ~90) to adjust the pH to 5.58. An additional 28 grams of acid was added to reduce the pH further to 5.21, and finally 19 grams more was added to reduce the pH to 4.85. The mixture was constantly homogenized. The pH was then raised to 5.58 by adding ammonium hydroxide. The material was again homogenized, screened, and aged at ambient conditions for 24 hours.

These materials were all spray dried to form an attrition resistant solid cogel catalyst.

EXAMPLE 2

Additional cogel catalyst samples were prepared as in Example 1, all using the syneresis step as in Batch E. The materials were spray dried at various spray drying conditions to form Batches F, G, H, I, and J. The results are shown in Table I.

TABLE I

| MATERIAL | Example 1 | | | | | Example 2 | | | | | Example 3 | Example 4 | Example 5 |
| --- | --- | --- | --- | --- | --- | --- | --- | --- | --- | --- | --- | --- | --- |
| | A | B | C | D | E | F | G | H | I | J | | | |
| Surface Area | 317 | 311 | 312 | 326 | 355 | 378 | 373 | 385 | 367 | 374 | 342 | 322 | 371 |
| Pore Size Dist. | 149 | 37 | 37 | 35 | 133 | 49 | 43 | 89 | 43 | 41 | 59 | 79 | 179 |
| Pore Volume | 0.79 | 0.40 | 0.41 | 0.29 | 0.64 | 0.49 | 0.50 | 0.71 | 0.48 | 0.47 | 0.54 | 0.67 | 0.94 |
| Al | — | — | — | — | — | 6 | — | — | — | — | 2 | — | ~4 |
| wt % $Al_2O_3$ | 2 | <5 | — | — | 2 | 10 | 12 | 10 | 14 | 13 | 17 | 19 | 2 |
| MAT Conversion, wt. % | 73 | 75 | 73 | 77 | 75 | 79 | 75 | 76 | 77 | 77 | 70 | 70 | 74 |
| $C_5$–430° | 39 | 40 | 40 | 41 | 40 | 40 | 39 | 41 | 40 | 39 | 39 | 39 | 41 |
| Coke | 14 | 12 | 12 | 13 | 13 | 15 | 14 | 13 | 14 | 14 | 10 | 9 | 11 |
| $C_4E/C_4/T$ | 0.50 | 0.42 | 0.42 | 0.37 | 0.44 | 0.40 | 0.42 | 0.41 | 0.40 | 0.41 | 0.50 | 0.53 | 0.49 |

EXAMPLE 3

Material was prepared as in Example 1, except the after titrating with $NH_4OH$, to a pH of 8, the slurry was heated to 52° C. for a total heating time of about 30 minutes, and filtered. The cake was washed as in Example 1. The syneresis step was accomplished by adding acetic acid to reduce the pH to 4.96. $NH_4OH$ was added to raise the pH to 5.63. The material was homogenized, aged overnight to a pH of ~5.57, rehomogenized, and spray dried.

EXAMPLE 4

Material was prepared as in Example 3, except that the slurry was heated to 81° C. for 47 minutes.

EXAMPLE 5

Material was prepared as in Example 3, except that it was titrated with $NH_4OH$ to a pH of 5.6, heated to 80°

C. over a 30 minute period and held at 80° C. for 10 minutes.

Comparative Cogel Catalyst Performance and Physical Characteristics After Steaming In order to mimic the type of conditions cogels of the present invention experience in an FCC process unit, representative cogel was steamed at 1450° F. for about 5 hours in 100% steam. To provide comparative examples with related cogels in the prior art, tests were also run on the cogels produce as described in U.S. Pat. Nos. 4,198,319 and 4,289,653. Table II, compares the range of characteristics for the steamed cogels of Example 1-5, with the above-identified patents.

| CHARACTERISTICS OF FEEDSTOCK A | |
|---|---|
| Aniline Point, °F. | 181.5 |
| API Gravity | 23.5 |
| Nitrogen, ppm | 1600 |
| Ramsbotton Carbon, wt % | 0.1 |

TABLE II

| | STEAMED COGELS | | |
|---|---|---|---|
| | Examples 1-5 (averaged) | U.S. Pat No. 4,198,319 | U.S. Pat No. 4,289,653 |
| Surface area | 140-200 | 176-189 | 106 |
| Pre size dist. | 100-250 | 69-111 | 39 |
| Pore volume | 0.3-0.9 | 0.4-0.5 | 0.2 |
| % $\gamma Al_2O_3$ | <2-20 | >29% | ≧14 |
| MAT | | | |
| Conversion, wt. % | 52-60 | 52-60 | 49 |
| $C_5$-430° F. | 36-40 | 36-38 | 35 |
| Coke | 3-5 | 3-4 | 3.1 |

TABLE II-continued

| | STEAMED COGELS | | |
|---|---|---|---|
| | Examples 1-5 (averaged) | U.S. Pat No. 4,198,319 | U.S. Pat No. 4,289,653 |
| $C_4E/C_4T$ | 0.4-0.7 | 0.5-0.7 | 0.61 |

What is claimed is:

1. A process for catalytically cracking hydrocarbonaceous feedstock, wherein said cracking catalyst consists essentially of a cogelled, silica-alumina cogel prepared by the method consisting essentially of:
   a. mixing a silicate solution with an aqueous solution of an acid aluminum salt and an acid, to form an acidified silica sol in said aluminum salt solution, and adjusting said silica sol/aluminum salt solution mixture to a pH in the range of about 1 to 4;
   b. slowly adding sufficient base with vigorous stirring, to said acidified silica sol/aluminum salt solution mixture to form a cogel slurry or silica and alumina, and to adjust said slurry to a pH in the range of about 5 to 9;
   c. aging said cogel slurry at a temperature of ambient to 95° C.;
   d. adjusting the pH of said cogel slurry to about 5-9;
   e. recovering a cogelled mass form said slurry;
   f. washing said cogelled mass;
   g. adjusting the pH of said cogelled mass to between about 4 and 7, and controlling conditions to induce syneresis to provide a cogel having meso and macro pore sizes and a $N_2$ pore size distribution peak diameter ranging from about 30 Å to 260 Å; and
   h. forming said combination into particles.

2. The process as claimed in claim 1 wherein said hydrocarbonaceous feed comprises residuum or incremental residuum.

3. The process as claimed in claim 2 wherein said residuum contains catalyst-contaminating metals.

* * * * *